(12) United States Patent
Leung et al.

(10) Patent No.: US 8,996,527 B1
(45) Date of Patent: *Mar. 31, 2015

(54) CLUSTERING IMAGES (71) Applicant: Google Inc., Mountain View, CA (US)

(72) Inventors: King Hong Thomas Leung, Santa Clara, CA (US); Jay Yagnik, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/196,463

(22) Filed: Mar. 4, 2014

Related U.S. Application Data

(63) Continuation of application No. 12/612,650, filed on Nov. 4, 2009, now Pat. No. 8,676,803.

(51) Int. Cl.
*G06F 17/30* (2006.01)

(52) U.S. Cl.
CPC .... *G06F 17/30268* (2013.01); *G06F 17/30265* (2013.01); *Y10S 707/915* (2013.01)
USPC .......................................... 707/737; 707/915

(58) Field of Classification Search
CPC ..................... G06F 17/30265; G06F 17/30268
See application file for complete search history.

(56) References Cited

U.S. PATENT DOCUMENTS

| 6,564,202 | B1 | 5/2003 | Schuetze |
|---|---|---|---|
| 7,181,444 | B2 | 2/2007 | Porter |
| 7,181,678 | B2 | 2/2007 | Chundi |
| 7,860,854 | B2 | 12/2010 | Lipson |
| 8,065,316 | B1 | 11/2011 | Baker |
| 8,452,758 | B2 | 5/2013 | Tong |
| 2005/0055344 | A1 | 3/2005 | Liu |
| 2006/0136455 | A1 | 6/2006 | Wen |
| 2006/0288038 | A1 | 12/2006 | Zheng |
| 2007/0011154 | A1 | 1/2007 | Musgrove |
| 2007/0097420 | A1 | 5/2007 | Shah |
| 2007/0174269 | A1 | 7/2007 | Jing |
| 2007/0174790 | A1 | 7/2007 | Jing |
| 2009/0034805 | A1 | 2/2009 | Perlmutter |
| 2009/0119259 | A1 | 5/2009 | Williams |
| 2009/0171929 | A1 | 7/2009 | Jing |

(Continued)

OTHER PUBLICATIONS

X. Yin, M. Li, L. Zhang, and H. J. Zhang, "Semantic Image Clustering Using Relevance Feedback," 2003, IEEE, Proc. of the 2003 International Symposium on Circuits and Systems (ISCAS), vol. 2, pp. 904-907.*

(Continued)

*Primary Examiner* — Richard Bowen
(74) *Attorney, Agent, or Firm* — Fish & Richardson P.C.

(57) ABSTRACT

Methods, systems, and apparatus, including computer programs encoded on computer storage media, for clustering images. In one aspect a system includes one or more computers configured to, for each of a plurality of digital images, associate extrinsic image-related information with each individual image, the extrinsic image-related information including text information and co-click data for the individual image, assign images from the plurality of images to one or more of the clusters of images based on the extrinsic information associated with each of the plurality of images, receive in the search system a user query from a user device, identify by operation of the search system one or more clusters of images that match the query, and provide one or more cluster results, where each cluster result provides information about an identified cluster.

20 Claims, 6 Drawing Sheets

(56) References Cited

U.S. PATENT DOCUMENTS

| | | |
|---|---|---|
| 2009/0292674 A1 | 11/2009 | Dasdan |
| 2010/0030768 A1 | 2/2010 | Poblete |
| 2010/0082662 A1 | 4/2010 | Taylor |
| 2010/0131500 A1 | 5/2010 | van Leuken et al. |
| 2010/0205202 A1 | 8/2010 | Yang |
| 2010/0274790 A1 | 10/2010 | Hong |
| 2010/0281036 A1 | 11/2010 | Inoue |
| 2010/0332491 A1 | 12/2010 | Cui |
| 2011/0029515 A1 | 2/2011 | Scholz |

OTHER PUBLICATIONS

Upstill et al., 'Visual Clustering of Image Search Results,' 2001 Microsoft Research Proceedings. SPIE vol. 4302, 49-59.

Joachims et al., 'Accurately Interpreting Clickthrough Data as Implicit Feedback,' 2005 ACM, SIGIR '05 Aug. 15-19, 2005, all pages.

Wang et al., 'Annotating Images by Mining Image Search Results,' IEEE Transactions on Pattern Analysis and Machine Intelligence, vol. 30, No. 11, Nov. 2008.

Burke, Richard. "eHow: How to Use Face Recognition in Apple iPhoto." Retrieved Nov. 10, 2009. Retrieved from the Internet: URL: http://www.ehow.com/how_4905469_use-face-recognition-apple-iphoto.html.

Duda, Richard, Peter E. Hart, and David G. Stork. "Hierarchical Agglomerative Clustering: Pattern Classification," John Wiley and Sons, 2000.

Duda, Richard, Peter E. Hart, and David G. Stork. "K-Means Clustering: Pattern Classification," John Wiley and Sons, 2000.

Google. "Explore Images with Google Image Swirl, Now in Labs." Nov. 11, 2009. Retrieved from the Internet: URL: http://googleblog.blogspot.com/2009/11/explore-images-with-google-image.

Google. "Google Similar Images." Apr. 20, 2009. Retrieved on Nov. 10, 2009. Retrieved from the Internet: URL: http://googlesystem.blogspot.com/2009/04/goole-similar-images.html.

Grangier, David and Samy Bengio. "A Discriminative Kernel-Based Model to Rank Images from Text Queries," IEEE Transactions on Pattern Analysis and Machine Intelligence (PAMI), 30(8):1371-1384, 2008.

Flickr. "Flickr: Explore/ Tags/ Spitfire/ Clusters." Retrieved on Nov. 10, 2009. Retrieved from the Interet: URL:http://flickr.com/photos/tags/spitfire/clusters/.

Flickr. "Flickr: F18E777's Photostream/Tag/Raptor." Retrieved on Nov. 10, 2009. Retrieved from the Internet: URL: http://www.flickr.com/photos/fi8e777/tags/raptor/.

Jing, Yushi and Shumeet Baluja. "Visual Rank: Applying PageRank to Large-Scale Image Search." IEEE Transaction on Pattern Analysis and Machine Intelligence, vol. 30, No. 11; Nov. 2008.

NG, Andrew Y., Michael Jordan, and Yair Weiss. "On Spectral Clustering: Analysis and an Algorithm," NIPS 14, 2002.

Wikipedia. "TinEye." Retrieved on Nov. 10, 2009. Retrieved from the Internet: URL: http://en.wikipedia.org/wiki/TinEye.

\* cited by examiner

CLUSTERING IMAGES

CROSS-REFERENCE TO RELATED APPLICATIONS

This application is a continuation and claims the benefit of priority under 35 USC 120 of U.S. patent application Ser. No. 12/612,650 filed Nov. 4, 2009 whose contents are incorporated herein for all purposes.

BACKGROUND

This specification relates to clustering digital images.

Search engines process queries and return search results in response to the queries. The search results are drawn from a collection of resources that can be limited to a single type of media. For example, some search engine systems access information on thousands of image resources and provide, in response to a query, a set of image search results that identify a subset of the image resources. The search results can include a thumbnail image of an image resource. Returned image search results can be responsive to a single query but can be associated with image resources depicting numerous subject matters. For example, a search for "Paris" can return search results with thumbnails depicting Paris Hilton, the Eiffel Tower, and maps of the city Paris. A user of an image search engine may be particularly interested in image resources relating to one of these subject matters.

SUMMARY

The specification describes technologies relating to clustering images. In general one aspect of the subject matter described in this specification can be embodied in methods that include the actions of, for each of a plurality of digital images stored in a computer storage medium, associating in a search system extrinsic image-related information. The extrinsic image-related information includes text information from the individual image or a digital source resource in which the individual image is embedded. The digital source resource is stored in a computer storage medium. The extrinsic image-related information includes co-click data. The co-click data identifies other images associated with the individual image because the same user selected both search results identifying the individual image and search results identifying the other images from among search results presented in response to identical queries. The actions include assigning images from the plurality of images to one or more of the clusters of images based on the extrinsic information associated with each of the plurality of images. The actions include receiving in the search system a user query from a user device. The actions include identifying by operation of the search system one or more clusters of images that match the query. The actions include providing, from the search system to the user device in response to the query, one or more cluster results, where each cluster result provides information about an identified cluster. Other embodiments of this aspect include corresponding systems, apparatus, and computer programs recorded on computer storage devices, each configured to perform the operations of the methods.

These and other embodiments can each optionally include one or more of the following features. The actions can include identifying by operation of the search system, one or more pre-existing clusters of images that match the user query, wherein the assigning occurs before receiving the user query. The cluster result provided to the user device can include an individual search result identifying an image that does not match the user query. The actions can include identifying the plurality of images by operation of the search system, the plurality of images being identified as images that individually match the received user query, wherein assigning each image from the plurality of images to one or more clusters of images occurs after receiving the user query. The actions can include caching information that identifies, for the user query, the images assigned to each cluster and the clusters that match the user query, and in response to a subsequent receipt of an identical user query, providing a cluster result for each of the matching clusters identified in the cached information. The actions can include associating one or more labels with each of one or more images in the plurality of images, and assigning each image from the plurality of images to one or more clusters of images based on the extrinsic information associated with each of the plurality of images and based on the labels associated with each of the plurality of images. The actions can include receiving from an object recognition engine the one or more labels for each of the one or more images in the plurality of images. The actions can include identifying in the search system images that individually match the user query, and providing, from the search system to the user device in response to the user query, individual image search results for the images that individually match the user query along with the cluster results. The actions can include generating a web page that includes the individual image search results and the cluster results. The cluster results can each include individual image search results from each corresponding cluster of images. The individual image search results for each cluster can be grouped together and set apart from the individual image search results. The actions can include transmitting the web page from the search system for display on the user device. The actions can include assigning images from the plurality of images to two or more of the clusters of images based on the extrinsic information associated with each of the plurality of images, identifying by operation of the search system two or more clusters of images that match the query, and providing, from the search system to the user device in response to the query, two or more cluster results, where each cluster result provides information about an identified cluster. Each cluster result can include descriptive text for the identified cluster. Each cluster result can include a representative image from the identified cluster.

Particular embodiments of the subject matter described in this specification can be implemented so as to realize one or more of the following advantages. A user of an image search engine can view clusters results that are responsive to a query. A user can select a link associated with a cluster result to view a subset of individual image search results that are responsive to the query. Selection of the link can also cause the search engine to present image search results from the cluster that are not otherwise responsive to the query. Image search results can be presented in clusters that are associated with particular subject matters for viewing by users of the search engine. Further, search engine users' search histories can be used to assign the image search results to clusters. By using users' search histories, a system can exploit users' perceptions of image subject matter, without requiring users to provide tags.

DESCRIPTION OF DRAWINGS

Like reference symbols in the various drawings indicate like elements.

DETAILED DESCRIPTION

Figure 1A:
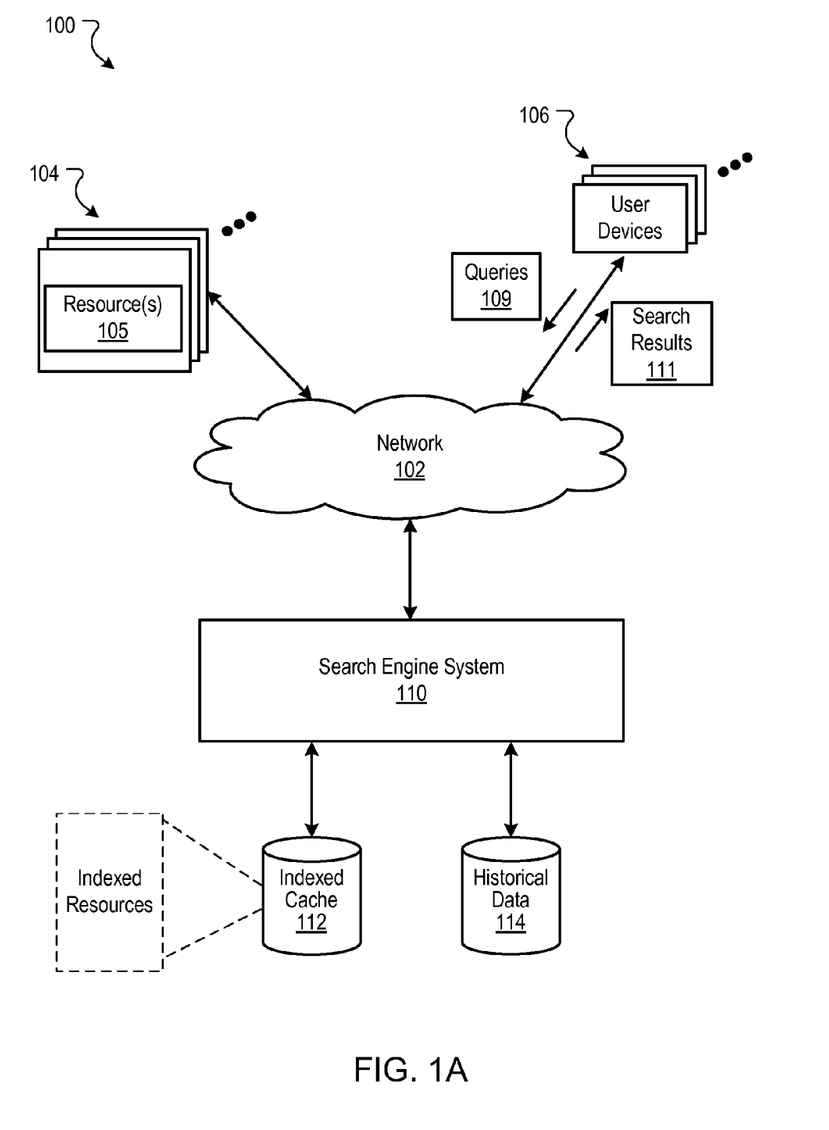
FIG. 1A is a block diagram of an example environment in which a search engine system provides search services.

FIG. 1A is a block diagram of an example environment 100 in which a search engine system 110 provides search services. The example environment 100 includes a network 102, e.g., a local area network (LAN), wide area network (WAN), the Internet, or a combination of them, connects web sites 104, user devices 106, and the search engine system 110. The environment 100 may include many thousands of publishers 104 and user devices 106.

A web site 104 is one or more resources 105 associated with a domain name and hosted by one or more servers. An example web site is a collection of web pages formatted in hypertext markup language (HTML) that can contain text, digital images, multimedia content, and programming elements, e.g., scripts. Each web site 104 is maintained by a publisher, e.g., an entity that manages and/or owns the web site.

A resource 105 is any data that can be provided by a web site 104 over the network 102 and that is associated with a resource address. Such digital resources 105 include HTML pages, word processing documents, portable document format (PDF) documents, images, video, and feed sources, to name just a few. The resources 105 can include content, e.g., words, phrases, images and sounds and may include embedded information (e.g., meta information and hyperlinks) and/or embedded instructions (e.g., JavaScript scripts).

An image resource can be included within an HTML page resource. In general, an image resource will be the target of a link in a web page or other text resource on the Internet, which may be referred to as a source resource for the image resource. As an illustration, a web browser may display an image resource as embedded within with a web page. The linked or embedded image resource can be separately addressable (i.e., the image resource is uniquely associated with a Uniform Resource Locator (URL)). In some examples, an image resource is not linked to by a web page or embedded in a web page. The image resource may be only accessible by knowing the URL for the image. In some implementations, the image resource is a portion of the source resource (e.g., the image resource is an image included within a PDF file).

A user device 106 is an electronic device that is under control of a user and is capable of requesting and receiving resources 105 over the network 102. Example user devices 106 include personal computers, mobile communication devices, and other devices that can send and receive data over the network 102. A user device 106 typically includes a user application, e.g., a web browser, to facilitate the sending and receiving of data over the network 102.

To facilitate searching of resources 105, the search engine system 110 identifies the resources 105 by crawling and indexing the resources 105 provided on web sites 104. Data about the resources 105 can be indexed based on the resource to which the data corresponds. The indexed and, optionally, cached copies of the resources 105 are stored in an indexed cache 112.

The user devices 106 submit search queries 109 to the search engine system 110. In response, the search engine system 110 accesses the indexed cache 112 to identify resources 105 that are relevant to the search query 109. The search engine system 110 identifies the resources 105, generates search results 111 that identify the resources 105, and returns the search results 111 to the user devices 106. A search result 111 is data generated by the search engine system 110 that identifies a resource 105 that is responsive to a particular search query, and includes a link to the resource 105. An example search result 111 can include a web page title, a snippet of text or a portion of an image extracted from the web page, and the URL of the web page.

For a search directed to images that uses a text query as input, the search results (hereinafter referred to as image search results) are ranked based on a combination of a relevance score of a source resource with a relevance feedback score of an image resource embedded in the source resource. A relevance score of a source resource is a combination of an information retrieval ("IR") score and page quality scores of each source resource relative to other resources. In some implementations, the IR scores are computed from dot products of feature vectors corresponding to a search query 109 and a source resource 105. An example relevance feedback score is a score derived from a selection rate (e.g., click-through-rate) of an image resource when that image is referenced in an image search result for a query. These combined scores are then used to present image search results directed to the images embedded in the resources 105.

The relevance scores for an image resource can be based, in part, on labels that are associated with the image resource. Labels are textual content or data flags that indicate a topic to which the image resource belongs. Labels can be explicitly associated with an image, for example, by the publisher that is providing the image resource. As an illustration, a publisher can associate the text "football" with an image resource that includes content that is directed to football (e.g., an image of a football or a football player). Labels can also be explicitly associated with an image resource by users to whom the image is presented. As an illustration, users can engage in activities, such as online games, in which the users provide text that describes the content of an image resource that is presented to the user. In turn, when a threshold portion of users have specified particular text as being descriptive of the image resource, the image resource can be labeled with the particular text.

Labels can also be associated with an image resource based on the relevance feedback for the image resource. As an illustration, a label matching a query can be associated with an image resource when the image resource is selected for presentation by users with at least a threshold selection rate. The threshold selection rate can be specified as a portion of the total search results for the query in which the image resource is referenced. In turn, the label can then be used to select the image resource for reference in image search results responsive to future instances of the query. The search engine system 110 can identify relevant text for labels for images and/or associate one or more labels corresponding to the relevant text with the images. The relevant text can be text that appears on a web page with the image.

The relevance score for an image resource to a query can be based on how well an image label matches the query. As an illustration, an image having a label that is the same as the query can have a higher relevance score to the query than an image having a label that is a root of the query or otherwise matches the query based on query expansion techniques (e.g., synonym identification or clustering techniques). Similarly, image resources having labels that match the query are identified as more relevant to the query than image resources that do not have labels matching the query. In turn, the image resources having labels that match the query may be selected for reference at higher image search result positions in a search results page than images that do not match the query.

The user devices 106 receive the image search results 111, e.g., in the form of one or more web pages, and render the pages for presentation to users. In response to the user selecting a link in a search result at a user device 106, the user device 106 requests the image or source resource 105 identified by the link. The web site 104 hosting the image or source resource 105 receives the request for the resource from the user device 106 and provides the image or source resource 105 to the requesting user device 106.

Search queries 109 submitted during user sessions are stored in a data store such as the historical data store 114. Selection data specifying user interactions with a search results page provided by a search engine system are also stored in a data store such as the historical data store 114. These actions can include whether a search result was selected. The data stored in the historical data store 114 can be used to map search queries 109 submitted during search sessions to resources 105 that were identified in search results 111 and the actions taken by users.

Figure 1B:
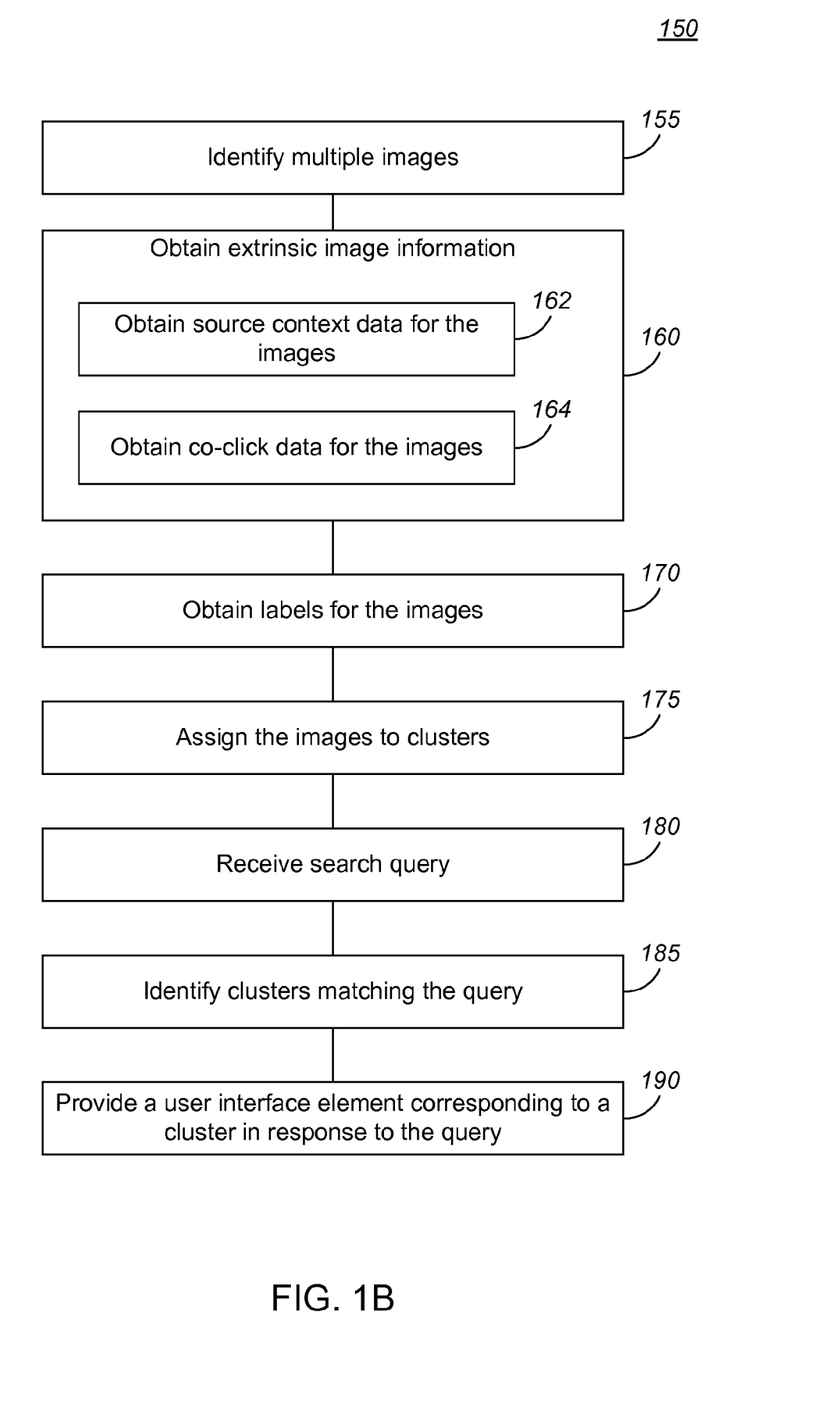
FIG. 1B is a flow chart of an example process for clustering image search results.

FIG. 1B is a flow chart of an example process for clustering image search results. The search engine system identifies multiple image resources (step 155). The identified image resources can be those image resources found by crawling and indexing the source and image resources 105 provided on web sites 104. When the web crawler finds an image resource, an instance of the image resource or a thumbnail of the image resource can be cached in the search engine system. Information identifying the image resource and its source can also be copied to the search engine system.

The search engine system obtains extrinsic image information for the identified image resources (step 160). The extrinsic image information includes source context data for the images and co-click data for the images. Source context data is text in a source resource for the image resource, text in a resource linking to the image resource, text embedded in the image resource, or any combination of these examples. For example, source context data can include text displayed to a user when the source resource is viewed with a browser, anchor text, text in an "alt" tag for the image resource, referring links, and time/date information. The source context data for the identified image resources can be collected when the search engine system crawls the source resource for the image resource. One form of source context data can be labels derived from text near the image.

Co-click data is information that identifies historical co-occurrences of selections of images by users from among results provided to the users by a search engine for specific queries. The information can be stored in or obtained from the historical data store 114 that includes selection data specifying user interactions with a search results page provided by a search engine system. As an illustration, a user viewing a search results page in response to a query can click one image search result to view the associated image or source resource. After viewing the resource, the user can navigate back to the search results page and click on a second image search result. The co-click data is information identifying the selection of the first and second image search result for a single query. In another illustration, the same user views a search results page in response to a second, identical query submitted at a later point in time and clicks a third image search result. The co-click data identifies selection of the first, second, and third image search results for the single identical query from the same user. Depending on the information available for any particular image, the search engine system obtains context data for the images (step 162) or co-click data for the images (step 164) or both.

The search engine system obtains labels for the image resources (step 170). In some implementations, a database of labels is available to the search engine system. The database can be indexed by a Uniform Resource Locator (URL), Uniform Resource Identifier (URI), or image resource identifier to obtain labels for an image resource. The labels can be generated based upon any conventional technique for assigning labels to images. As described above, the labels can be associated with an image resource by a publisher, by users, or automatically by a search system. As an illustration, a search system can associate an image resource with a label that is derived from a search query. The association occurs when user interaction is received selecting an image search result that provides access to the image resource in response to a query.

In some implementations, the label data is generated by an object/concept recognition engine. For example, the label data can be generated based on an object recognition system as described in "A Discriminative Kernel-Based Model to Rank Images from Text Queries," IEEE Transactions on Pattern Analysis and Machine Intelligence (PAMI), 30(8):1371-1384, 2008. The labels applied by the object/concept recognition engine to the images can be selected from the most popular queries that users perform in a search engine system (e.g., the top 100; 1,000; 10,000; 100,000; 1,000,000; or 10,000,000 topics). Image resources that are associated with the most frequently selected image search results for each query can provide the "seed" image templates for identification of similar objects or concepts in other image resources.

The search engine system assigns the image resources to clusters (step 175). Any conventional technique for clustering images into segments or groups can be used. The system uses as input for the clustering the extrinsic information and the labels. For example, spectral clustering methods can be implemented with algorithms that cluster points using eigenvectors of matrices derived from the distances between the points. Example systems are described in "On Spectral Clustering: Analysis and an Algorithm," Andrew Y. Ng, Michael Jordan, and Yair Weiss, NIPS 14, 2002. Other methods for clustering images into segments or groups include K-means clustering or Hierarchical agglomerative clustering, both described in "Pattern Classification," Richard O. Duda, Peter E. Hart, and David G. Stork, John Wiley and Sons, 2000. The clustering is based on the extrinsic information and the labels assigned to the identified image resources. An image resource need not be associated with all three types of data—source context data, co-click data, and labels—to be included in a cluster. An image resource can be assigned to more than one cluster.

The search engine system receives a search query (step 180). In some implementations, the search query is received by the search engine system as part of a query request that the user device transmits to the search engine system. A user of the user device may have entered the query into a query field in a web page displayed by a web browser and clicked a "search" button.

The search engine system identifies one or more image resource clusters that match the query (step 185). The search engine can implement any one of the following techniques to determine that a cluster matches a query. The search system can determine that a cluster matches a query if terms in the query are included among the source context data for image resources in the cluster. The search system can determine that a cluster matches a query if terms in the query are the same as terms included in the label data for images resources in the cluster. The search system can determine that a cluster matches a query if image search results that match the query are associated with image resources in the cluster. The search engine system can be implemented to use any one, two, or three of the above described techniques.

The search engine system provides one or more cluster results (step 190). A cluster result is a user interface element that identifies a cluster that matches the query. Example cluster results include descriptive text, a link that displays images from the cluster, a sample image from the cluster, and a group of images from the cluster. In some implementations, providing the cluster results includes generating a web page that displays the cluster results and transmitting the web page to the user for display on a display device. A web page is an HTML page, XML page, or some other electronic document.

Figure 3A:
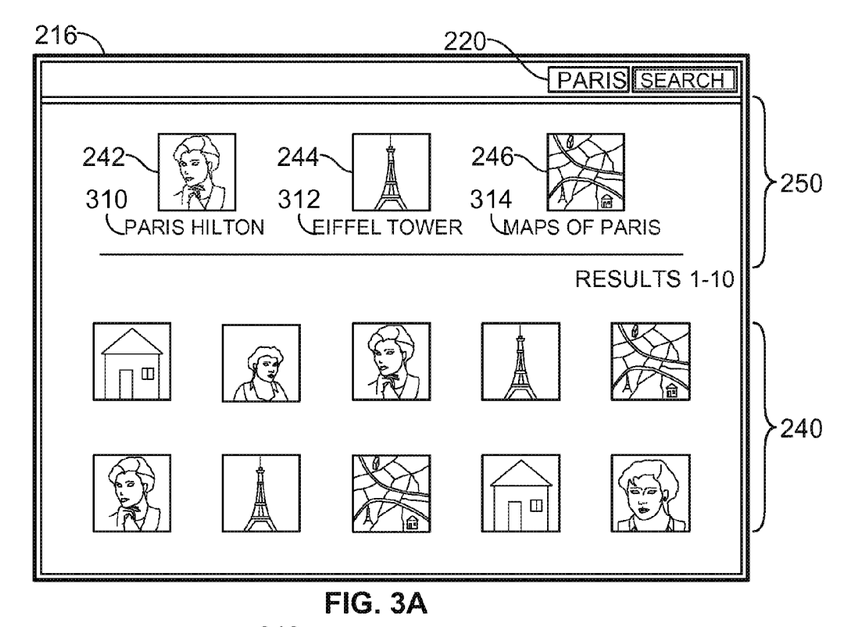
FIG. 3A illustrates an example presentation of cluster results.
Figure 3B:
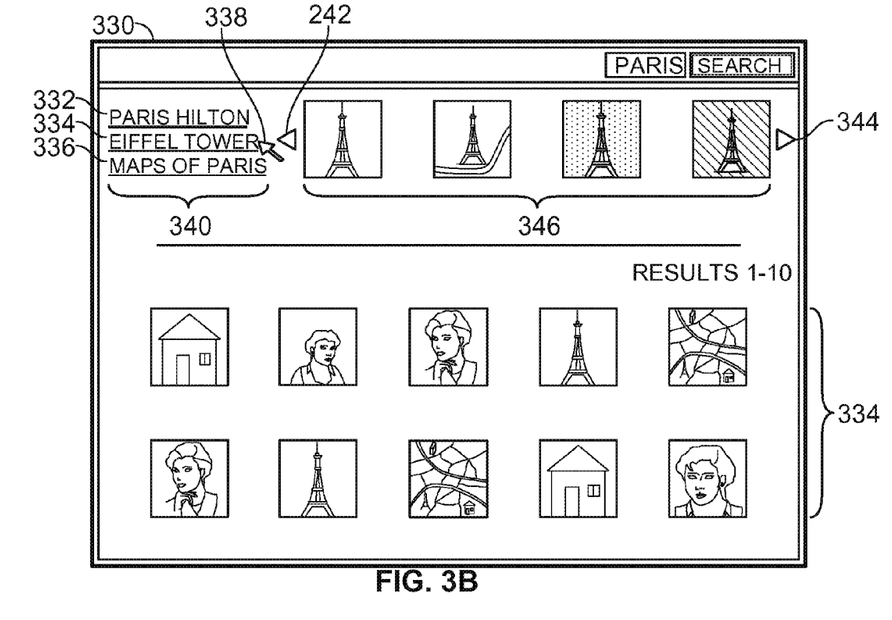
FIG. 3B illustrates an example presentation of cluster results.
Figure 3C:
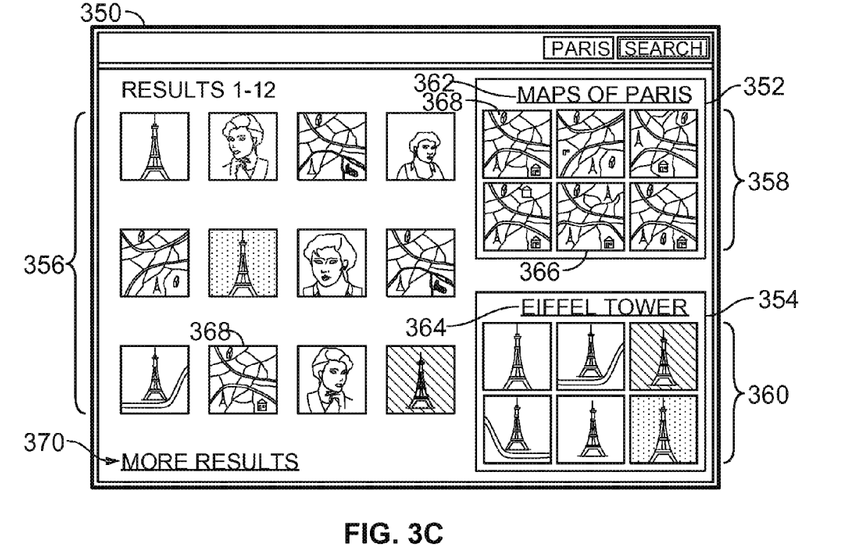
FIG. 3C illustrates an example presentation of cluster results.

In some implementations, the generated web page includes other information that matches the query. For example, the web page can include a collection of individual image search results. The individual image search results are images that individually match the query. A set of image search results for a cluster can be displayed in the web page as grouped together and set apart from the individual image search results (FIG. 3C). An individual image search result and an image search result displayed as part of a set of image search results for a cluster can both identify the same image resource. Various configurations for displaying cluster results are illustrated in FIGS. 3A-3C.

In alternative implementations, the search engine system receives the search query first, identifies multiple image resources that match the query, and obtains the extrinsic information and labels for the image resources that match the query. The identified image resources are assigned to clusters based upon the obtained extrinsic information and labels. The image resource clusters are provided in response to the query. In such implementations, the clusters are specific to the search query and identifying clusters that match the query is unnecessary. In some such implementations, clusters for frequently received queries are cached.

Figure 2A:
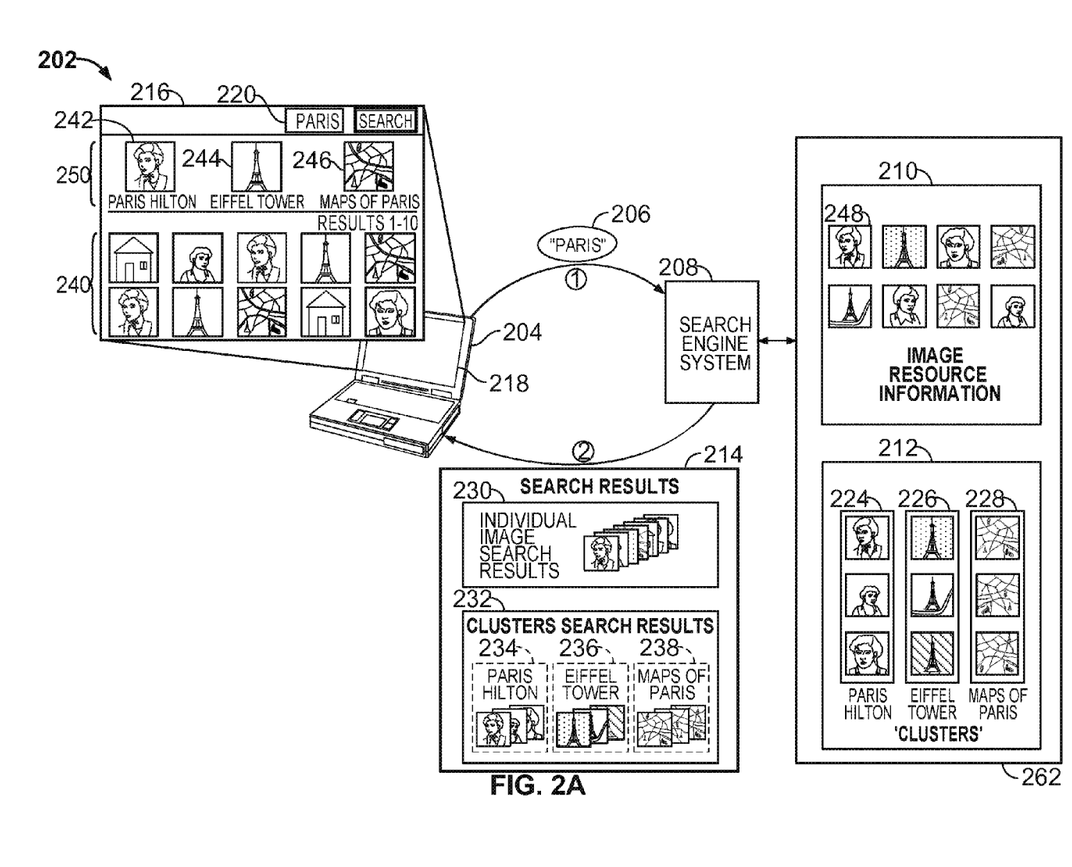
FIG. 2A illustrates an example system that provides clustered image search results that are responsive to a query.

FIG. 2A illustrates a simplified example system 202 that provides cluster results 232 that are responsive to a query 206. As an illustration of example system 202, user device 204 displays a search engine web page 216 on a display device 218 to a user of the user device. The displayed web page 216 can include a text box for user entry of a search query 206. In this illustration, a user has typed the search query "Paris" into text box 220. Query 206 is transmitted in a query request by user device 204 to search engine system 208 over a data communication network (e.g., the Internet). The search engine system 208 can include a network of servers.

Search engine system 208 accesses information associated with image resources 210 and information associated with clusters 212 to identify image resources and clusters that match the query. The image resource information 210 has been collected by the search engine system and can include copies of image resources, thumbnail versions of the image resources, identification of a source resource for the image resource, and other information associated with the image resources. Any conventional technique for identifying image resources that match a query may be used. For example, if the query term "Paris" was included in a website that also includes an image resource, that image resource can be identified as matching the query.

The search engine system 208 also accesses cluster information 212 to identify clusters that are responsive to the query. The cluster information 212 can identify collections of image resources from those identified in the image resource information 210. Each of the clusters 212 can be associated with image resources for a particular subject matter. As an illustration, cluster 224 is associated image resources that depict Paris Hilton, cluster 226 is associated with image resources that depict the Eiffel Tower, and cluster 228 is associated with image resources that depict maps of the city Paris. The clusters can pre-exist the query or can be determined in response to receiving the query. In either case, a subset of the clusters 212 can be identified as responsive to the query 206, as described in step 185 of process 150. As an illustration, search engine system 208 can identify a "Paris Hilton" cluster 224, an "Eiffel Tower" cluster 226, and a "Maps of Paris" cluster 228 as matching the query "Paris" from a larger collection of clusters 212 that also includes a "Sweden" cluster, a "Dinosaurs" cluster, and a "Rock Climbing" cluster.

The search engine system 208 provides individual image search results 230 and cluster search results 232 in response to the query for transmission over the data communication network to the user device 204. Each individual image search result is associated with an image resource that the search engine system 208 identified as matching the query. The individual image search results 230 can include a link to the image resource, a thumbnail version of the image resource, and information about the image resource (e.g., size, date modified, a description, user-supplied labels, etc.). Each of the cluster results 232 is associated with a cluster that the search engine system identified as matching to the query. The cluster results can include descriptive text or a tag identifying a subject matter of the cluster, thumbnail versions of image resources assigned to the cluster, and links to the image resources assigned to the cluster or source resources for the image resources.

Figure 2B:
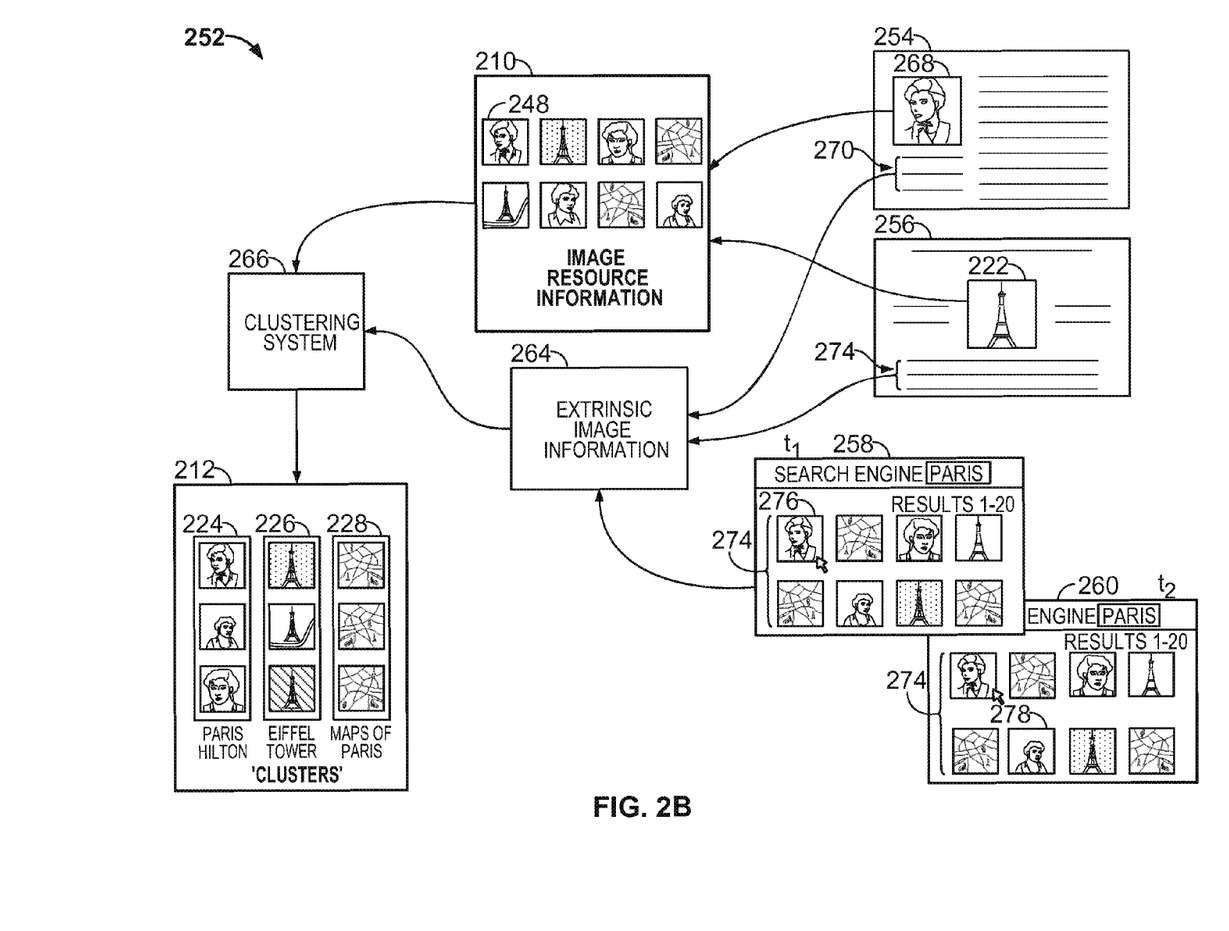
FIG. 2B illustrates an example system for clustering image search results.

FIG. 2B illustrates an example system 252 for clustering images. Information on image resources 210 is collected from a first web page 254 and a second web page 256 by a search engine system. A copy of identified image resources (e.g., thumbnails) or information on the identified image resources (e.g., the location of the image resources) is stored as image resource information 210. Extrinsic image information 264 is collected from the first and second web pages. As an illustration, the first web page 254 includes a block of text 270 that is displayed near an image resource 268 depicting Paris Hilton. A copy of the block of text 270, or portions thereof, is collected and stored within extrinsic image information 210 and associated with the image resource 268 that depicts Paris Hilton. Clustering system 266, a portion of the search engine system 208, accesses the image resource information 210 and the extrinsic image information 264 to create clusters 212 (e.g., clusters 224, 226, and 228).

In some implementations, extrinsic image information 264 is also collected from search engine user usage of a first search engine results pages 258 and a second search engine results page 260. As an illustration, a first search engine results page 258 and a second search engine results page 260 represent the same search engine results page at different points in time. In the first search engine results page 258 (at time t1), a user has searched for "Paris" and has been presented with individual image search results 274. The individual image search results 274 depict Paris Hilton, the Eiffel tower, and maps of Paris. The user that submitted the query is interested in images of Paris Hilton and selects image search result 276 depicting Paris Hilton, navigating to the first web page 254 (i.e., the source resource for the image resource depicting Paris Hilton). After viewing the first web page 254, the user navigates back to second search engine results page 260 (the first search engine results page 258 but at time t2). The user selects image search result 278, also of Paris Hilton. Information recording the selection of the two images in response to a single search query ("co-click data") is stored within the extrinsic image information 264. In some examples, co-click data can include user selections of image search results during a series of queries. As an illustration, a search engine user may query "Paris" and select a single image search result for viewing. The user then may query "Paris Hilton" and select another image search result.

In some implementations, the extrinsic image information 264 includes different types of user usage information from use of the first and second search engine results pages 258 and 260. As an illustration, the extrinsic image information 264 can include information recording a number of total selections of the image search result 276 of Paris Hilton by all users in response to a particular search query. The extrinsic image information 264 can also include information recording a length of time viewing the first web page 254 after selection of the image search result 276 of Paris Hilton. Queries entered subsequent to an image search result selection can be included in the extrinsic image information 264, in some examples. As an illustration, the query "Paris Hilton" can be associated with the image search result 276 if a user types in "Paris Hilton" after selecting the search result.

In some implementations, extrinsic image information 264 includes labels associated with image resources and obtained from an object recognizer (not shown in FIG. 2B). The object recognizer can process image resources identified by the image resource information 210 and assign labels to the image resources based upon objects or concepts identified in the image resource. For instance, an image resource that portrays the Eiffel Tower with balloons in the foreground can be assigned the labels "Eiffel Tower" and "Balloons."

Clustering system 266 accesses extrinsic image information 264 to form clusters (e.g., clusters 224, 226, and 228). In various illustrations where the clusters 212 are formed in response to the "Paris" query 206, clusters are formed for the most common labels that are associated with the identified individual image search results 230 (i.e., labels associated with image resources identified by the individual image search results). The clusters 212 can be stored and retrieved upon a subsequent "Paris" query provided by the same or a different user device.

In some implementations, the clusters 212 are pre-existing before queries are received. As an illustration, the search engine system crawls the web and identifies images. The identified images are assigned to image resource clusters. The search engine system can subsequently receive a search query and identify one or more of the pre-existing clusters as matching the search query. In some illustrations, each of the pre-existing clusters 212 is associated with a separate label provided by object recognizers. In other illustrations, the pre-existing clusters are associated with prominent image search results. In these illustrations, "seed" images can be identified based upon the labels or prominent image search results. Similar images can be identified using conventional techniques to populate the cluster. The "seed" images can also be selected by a person administrator of the clustering system 266.

In some implementations, a cluster is populated with additional image resources 222 based on similarity values between image resources. Similarity values can be calculated between two image resources using the extrinsic image information 264. For example, a similarity value can increase if the two image resources are associated with similar labels, similar portions of text from sources the image resources were obtained (e.g., text 270 and 274), or co-clicks. As an illustration, where a cluster includes "seed" image resources (as discussed previously), additional image resources that have a high similarity value to the seed image resources can be added to the cluster.

FIG. 3A illustrates an example presentation of cluster results. In some implementations, web page 216 is displayed to a user of user device 204 in response to a query. Individual search result images 240 are the images that are individually responsive to the query. Sample cluster images 250 are representative of the clusters 232 (of FIG. 2A) that are provided by the search engine system 208 in response to the query. In some illustrations, in response to a user selection of a sample cluster image (e.g., 242, 244, or 246) the portion of web page 216 that includes the individual image search results 240 is populated with image search results from the selected cluster. In other illustrations, the entire page is populated with image search results from the selected cluster and web page 216 does not display sample cluster images 250.

In some implementations, the sample cluster images 250 are accompanied by descriptive text. As an illustration, one sample cluster image 242 is accompanied by the descriptive text "Paris Hilton." In some implementations, the search system generates descriptive text by forming a union of all text labels associated with every image in the cluster. The displayed labels can be accompanied by a count of each label in the cluster. In some implementations, the search system generates descriptive text by tabulating labels for all the images in the cluster and displaying the most commonly occurring labels (e.g., the top 3, 5, or 6 labels). In some implementations, the search system generates descriptive text by tabulating labels for all the images in the cluster and displaying the labels where the count exceeds a pre-determined threshold (e.g., the count is greater than a percentage of the labels or a percentage of the images in the cluster). Display of descriptive text with sample cluster images is optional.

FIG. 3B illustrates an example presentation of cluster results. Links 340 are representative of the clusters 232 that are provided by the search engine system 208 in response to the query. Individual search result images 334 are representative of images that are individually responsive to the query. Cluster-specific image search results 346 depict the Eiffel Tower and are displayed in response to a user selection 338 of the Eiffel Tower cluster link 334. Additional cluster-specific image search results 346 of the Eiffel Tower can be displayed in response to a user selection of left arrow 342 and right arrow 344. In response to the query "Paris," but prior to user selection 338 of the Eiffel Tower cluster link 334, web page 330 can either display no cluster-specific image search results 346 or can display cluster-specific image search results 346 for a default cluster (e.g., the image search results for the "Paris Hilton" cluster).

FIG. 3C illustrates an example presentation of cluster results. Individual image search results 356 are the image search results 230 that are individually responsive to the query. Image clusters 352 and 354 display a subset of image search results 358 and 360 from each respective cluster. In response to a user selection of cluster-specific links 362 or 364, web page 350 is populated with additional cluster-specific search results.

In some implementations, at least some of the image search results in the "Maps of Paris" cluster 352 would not be displayed as individually responsive search results 356 in web page 350, but for their presentation as part of cluster 352. As an illustration, image search results 368 and 366 are both maps of Paris, and image 368 is presented both in cluster 352 and as an individual image search result that is individually responsive to the query "Paris." In contrast, image 366 is not individually responsive to the query Paris. In fact, repeated user-selection of more results link 370 will not yield a display of image 366 as an individually responsive search result. Regardless, image 366 is presented as part of cluster 352.

The disconnect between images displayed as individual image search results 356 and clustered results 352 and 354 can arise from the different methods for determining cluster membership and individual image responsiveness to a particular query. As an illustration, search engine system 208 may select individual search results 356 based upon textual information associated with the image or upon labels assigned by object recognizers. An image search result presented as part of a cluster may not have a label or be associated with any textual information, but may have a strong co-click correlation to an image in a cluster. As an illustration, image 366 depicts a map of Paris but is included in a website that does not mention the words "map" or "Paris." Image 366, however, shares a strong co-click correlation to image 368 and other images that depict maps of Paris. For this reason, image 366 is included and displayed in cluster 352, even though it would not otherwise be displayed as a search result.

In some implementations, the text in links 362 and 364 is selected based upon textual information that is common to a substantial number of images in a cluster. As an illustration, a substantial number of images 360 may be drawn from sources that include the term "Eiffel Tower." In some implementations, the text in links 362 and 364 is user-defined, for example by a search engine administrator or by users of the search engine.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions or tasks by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising:
one or more computers; and
a computer-readable medium coupled to the one or more computers having instructions stored thereon which, when executed by the one or more computers, cause the one or more computers to perform operations comprising:
for each of a plurality of digital images:
identifying co-click data for each individual image, the co-click data for the individual image identifying other images associated with the individual image because the same user selected, from presentation on search results pages of search results identifying images that are responsive to a particular query, both search results identifying the individual image and search results identifying the other images, and
identifying, for each individual image, a subsequent user-submitted query that was submitted subsequent to user selection of a search result that identified the individual image; and
assigning images from the plurality of images to clusters of images based on:
the co-click data associated with each of the plurality of images, and
the subsequent user-submitted queries associated with each of the plurality of images.

2. The system of claim 1, wherein the operations further comprise:
receiving a query; and
in response to receiving the query:
identifying one or more of the clusters of images based on the received query; and
providing a respective cluster result for each identified cluster of images, each cluster result including a plurality of individual search results, each individual search result referencing an image that was assigned to the respective identified cluster of images.

3. The system of claim 2, wherein providing the respective cluster result for a particular identified cluster of images comprises providing data that causes search results that reference images of the particular identified cluster of images to be displayed together in a group on a search results page.

4. The system of claim 2, wherein the provided data further causes descriptive text for the particular identified cluster of images to be displayed with the search results that reference the images of the particular identified cluster of images, the descriptive text being based on labels for images assigned to the particular identified cluster of images.

5. The system of claim 2, wherein identifying one or more clusters of images comprises identifying a particular cluster of images in response to determining that one or more terms of the received query match one or more terms of a label for an image assigned to the particular cluster of images.

6. The system of claim 2, wherein identifying one or more clusters of images comprises identifying a particular cluster of images in response to determining that one or more individual image search results that match the received query reference an image that is assigned to the particular cluster of images.

7. The system of claim 1, wherein assigning the images from the plurality of images to the clusters of images comprises assigning the images from the plurality of images to the clusters based further on one or more labels assigned to each of the plurality of images.

8. The system of claim 1, wherein assigning the images from the plurality of images to the clusters of images comprises assigning the images from the plurality of images to the clusters based further on a number of selections of a particular image of the plurality of images in response to the individual image being referenced by a search result provided in response to a particular query.

9. The system of claim 1, wherein assigning the images from the plurality of images to the clusters of images comprises assigning the images from the plurality of images to the clusters based further on an amount of time in which a user viewed a web page in response to selecting a search result that referenced a particular image of the plurality of images, wherein the search result being was provided in response to a particular query.

10. A method performed by a data processing apparatus, the method comprising:
    for each of a plurality of digital images:
        identifying, by the data processing apparatus, co-click data for each individual image, the co-click data for the individual image identifying other images associated with the individual image because the same user selected, from presentation on search results pages of search results identifying images that are responsive to a particular query, both search results identifying the individual image and search results identifying the other images, and
        identifying, by the data processing apparatus and for each individual image, a subsequent user-submitted query that was submitted subsequent to user selection of a search result that identified the individual image; and
    assigning, by the data processing apparatus, images from the plurality of images to clusters of images based on:
        the co-click data associated with each of the plurality of images, and
        the subsequent user-submitted queries associated with each of the plurality of images.

11. The method of claim 10, further comprising:
    receiving a query; and
    in response to receiving the query:
        identifying one or more of the clusters of images based on the received query; and
        providing a respective cluster result for each identified cluster of images, each cluster result including a plurality of individual search results, each individual search result referencing an image that was assigned to the respective identified cluster of images.

12. The method of claim 11, wherein providing the respective cluster result for a particular identified cluster of images comprises providing data that causes search results that reference images of the particular identified cluster of images to be displayed together in a group on a search results page.

13. The method of claim 11, wherein the provided data further causes descriptive text for the particular identified cluster of images to be displayed with the search results that reference the images of the particular identified cluster of images, the descriptive text being based on labels for images assigned to the particular identified cluster of images.

14. The method of claim 11, wherein identifying one or more clusters of images comprises identifying a particular cluster of images in response to determining that one or more terms of the received query match one or more terms of a label for an image assigned to the particular cluster of images.

15. The method of claim 11, wherein identifying one or more clusters of images comprises identifying a particular cluster of images in response to determining that one or more individual image search results that match the received query reference an image that is assigned to the particular cluster of images.

16. The method of claim 10, wherein assigning the images from the plurality of images to the clusters of images comprises assigning the images from the plurality of images to the clusters based further on one or more labels assigned to each of the plurality of images.

17. The method of claim 10, wherein assigning the images from the plurality of images to the clusters of images comprises assigning the images from the plurality of images to the clusters based further on a number of selections of a particular image of the plurality of images in response to the individual image being referenced by a search result provided in response to a particular query.

18. The method of claim 10, wherein assigning the images from the plurality of images to the clusters of images comprises assigning the images from the plurality of images to the clusters based further on an amount of time in which a user viewed a web page in response to selecting a search result that referenced a particular image of the plurality of images, wherein the search result being was provided in response to a particular query.

19. A non-transitory computer storage medium encoded with a computer program, the program comprising instructions that when executed by data processing apparatus cause the data processing apparatus to perform operations comprising:
    for each of a plurality of digital images:
        identifying, by the data processing apparatus, co-click data for each individual image, the co-click data for the individual image identifying other images associated with the individual image because the same user selected, from presentation on search results pages of search results identifying images that are responsive to a particular query, both search results identifying the individual image and search results identifying the other images, and
        identifying, by the data processing apparatus and for each individual image, a subsequent user-submitted query that was submitted subsequent to user selection of a search result that identified the individual image; and
    assigning, by the data processing apparatus, images from the plurality of images to clusters of images based on:
        the co-click data associated with each of the plurality of images, and
        the subsequent user-submitted queries associated with each of the plurality of images.

20. The non-transitory computer storage medium of claim 19, wherein the operations further comprise:
    receiving a query; and
    in response to receiving the query:
        identifying one or more of the clusters of images based on the received query; and
        providing a respective cluster result for each identified cluster of images, each cluster result including a plurality of individual search results, each individual search result referencing an image that was assigned to the respective identified cluster of images.

* * * * *